United States Patent [19]

Hsieh

[11] Patent Number: 4,753,973

[45] Date of Patent: Jun. 28, 1988

[54] ENHANCED OIL RECOVERY COMPOSITION

[75] Inventor: Wen-Ching Hsieh, Chino Hills, Calif.

[73] Assignee: Union Oil Company of California, Los Angeles, Calif.

[21] Appl. No.: 751,570

[22] Filed: Jun. 27, 1985

Related U.S. Application Data

[63] Continuation-in-part of Ser. No. 673,421, Nov. 20, 1984.

[51] Int. Cl.$^4$ .............................................. C08J 0/00
[52] U.S. Cl. .................................... 524/158; 524/161; 524/457; 524/556; 524/560; 524/747; 526/209
[58] Field of Search ............... 524/158, 161, 747, 457, 524/556, 560; 526/209

[56] References Cited

U.S. PATENT DOCUMENTS

| | | | |
|---|---|---|---|
| 2,753,318 | 7/1956 | Maeder | 524/747 |
| 2,868,748 | 1/1959 | Frazier | 524/747 |
| 3,003,987 | 10/1961 | Hager et al. | 260/29.6 |
| 3,035,004 | 5/1962 | Glavis | 260/29.7 |
| 3,244,655 | 4/1966 | Sullivan et al. | 260/29.6 |
| 3,329,640 | 7/1967 | Scotti et al. | 260/29.6 |
| 3,361,695 | 1/1968 | Wilhelm | 260/29.6 |
| 3,432,455 | 3/1969 | Rasicci | 260/29.7 |
| 3,649,581 | 3/1972 | Mast et al. | 260/29.6 Z |
| 3,679,000 | 7/1972 | Kaufman | 166/273 |
| 3,724,547 | 4/1973 | Bott | 166/274 |
| 3,806,484 | 4/1974 | Dargan | 260/29.6 |
| 3,891,567 | 6/1975 | Norton et al. | 252/8.55 D |
| 3,909,423 | 9/1975 | Hessert et al. | 252/8.55 D |
| 3,919,156 | 11/1975 | Khanna et al. | 260/29.6 RW |
| 4,148,746 | 4/1979 | Klemmensen et al. | 252/316 |
| 4,151,144 | 4/1979 | Dyson et al. | 260/29.6 WB |
| 4,283,321 | 8/1981 | Chakrabarti et al. | 524/747 |
| 4,329,268 | 5/1982 | Chakrabarti et al. | 524/166 |
| 4,357,442 | 11/1982 | Shan | 524/745 |
| 4,424,298 | 1/1984 | Penzel et al. | 524/747 |

FOREIGN PATENT DOCUMENTS 143268  11/1981  Japan ................................. 524/747

*Primary Examiner*—Joseph L. Schofer
*Assistant Examiner*—J. M. Reddick
*Attorney, Agent, or Firm*—Dean Sandford; Gregory F. Wirzbicki; Alan H. Thompson

[57] ABSTRACT

A stable latex composition possessing a viscosity of less than about 50 cp. comprised of an ethylacrylate/methylacrylic acid/acrylic acid polymer and co-surfactant system comprising a nonylphenol polyethylene oxide ether sulfate and a propoxylated, ethoxylated propylene glycol nonionic surfactant block polymer useful for increasing the viscosity of water that is injected into subterranean petroleum bearing formations for the enhanced recovery of the petroleum.

11 Claims, No Drawings

ENHANCED OIL RECOVERY COMPOSITION

This application is a continuation-in-part of U.S. patent application Ser. No. 673,421, filed Nov. 20, 1984.

BACKGROUND OF INVENTION

The present invention relates to a stable latex useful for increasing the viscosity of water and for the enhanced recovery of subterranean oil.

Enhanced oil recovery is typically carried out by flushing the oil-containing subterranean formations with a fluid capable of displacing the oil in the formation. This fluid is injected into the formation through at least one injection well so as to drive the oil through the formation to at least one production well. Fluids useful for enhanced oil recovery may either be a liquid or a gas with the most economical and widely used fluid being water. The major drawback with water is that it does not displace the petroleum efficiently since it is not immiscible with oil and because the interfacial tension between oil and water is quite high. The result is that the water will generally move past the oil to a more permeable area of the formation leaving behind substantial quantities of residue oil in the oil-bearing formations.

Various means have been developed to reduce the interfacial tension between the water and oil. This generally involves admixing various types of surfactants with water.

Typical surfactants, which have been used to reduce the interfacial tension between the water and the oil in subterranean formations, are the various types of sulfates and sulfonates, such as petroleum sulfates and sulfonates.

It is also generally desirable to provide the water with a viscosity greater than that of the oil present in the subterranean formation to increase the effectiveness of water in displacing the oil. The viscosity of the water may be increased by preparing aqueous emulsions or dispersions having a dispersed hydrocarbon phase, by dispersing a hydrocarbon, for example crude oil or distilled fractions of crude oil into water using surfactants such as the sulfonates or sulfates.

It is also known that the viscosity of water may be increased by preparing aqueous solutions or emulsions of certain types of polymers. Typically, a concentrated composition of these polymers is prepared which can be blended with water at the well site to increase the viscosity of the water prior to injection into the subterranean formation. U.S. Pat. No. 3,909,423 discloses a composition of polyacrylamides, polymethacrylamides, and water wherein a portion of the carboxyamide group has been hydrolyzed to form carboxyl groups which can then be cross linked so as to increase the viscosity of the water.

U.S. Pat. No. 3,891,567 discloses aqueous compositions which contain from about 0.001 percent to about 10 percent of a particularly hydrolyzed polyacrylamide and about 0.001 percent to about 10 percent of a carboxyl vinyl polymer. These compositions are disclosed as a flooding medium for recovering oil from subterranean oil-bearing formations.

U.S. Pat. No. 3,679,000 discloses a process for tertiary oil recovery which comprises injecting viscous water into the area of the oil deposit through an input well by incorporating into the water a minor amount of a water soluble polymer containing 5 percent of a repeating unit of the formula:

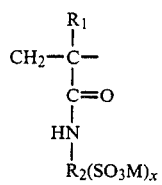

wherein $R_1$ is a hydrogen or lower alkyl, $R_2$ is a divalent or trivalent hydrocarbon, M is hydrogen or one equivalent of a cation, and X is one or two.

U.S. Pat. No. 4,148,746 discloses aqueous gels suitable as water thickening agents and are useful for enhanced oil recovery. This water thickening gel is prepared by polymerizing at least one alkyl acrylate monomer and at least one carboxylic polymerizable monomer selected from the group consisting of acrylic acid and methylacrylic acid. The carboxylic polymerizable monomer is present from 20 to 95 parts per weight per 100 parts of total monomer being polymerized and utilizing. The composition is disclosed as comprised of an emulsifier selected from the group consisting of disodium or diammonium nonylphenoxy polyethoxy sulfosuccinate having the general formula:

$$CH_3(CH_2)_8C_6H_4O(CH_2CH_2O)_{8-16}COCH_2CH-(COOM)SO_3Q$$

wherein Q is sodium or ammonium and a sodium or ammonium lauryl polyethoxysulfate having the general formula:

$$CH_2(CH_2)_{11}O(CH_2CH_2O)_{8-16}SO_3Q$$

wherein Q is sodium or ammonium, the polymer is in a latex form which is neutralized to a pH ranging between a pH of 5.5 to 11.5. These polymers also may be gelled with a water soluble polyvalent compound such as sodium dichromate and a water soluble reducing agent such as sodium hydrosulfite.

It should be evident that there are numerous types of polymers useful for increasing the viscosity of water. Since water is the cheapest fluid for enhanced oil recovery, it is desirable to produce an aqueous composition containing the lowest cost polymers for enhanced oil recovery operations. Some of the previously known polymers such as those comprising acrylamide, can significantly increase the cost of aqueous compositions compared to other types of polymer systems.

Besides low cost polymers the cost of using polymers for increasing the viscosity of water may be reduced by preparing aqueous polymeric compositions, such as latexes, with a high solids percentage of the polymer in the composition. These concentrated polymer compositions are typically transported to the well site and admixed with water, with the mixture injected into the formation. A high solids-containing emulsion or latex reduces the cost of operation because of the reduced cost of transporting the composition to the well site. Aqueous polymer compositions, such as those disclosed in U.S. Pat. No. 4,148,746, typically have solid contents around 20 percent.

It should be noted that, while it is desirable to increase the weight percent of polymer in the composition the stability of the composition during preparation, storage, transportation, and/or use in enhanced oil recovery should be such that the polymer does not precipitate out of solution and thus create the potential for plugging the subterranean formation.

It can thus be seen that it would be desirable to provide a stable aqueous composition containing a high percent solids level of an inexpensive polymer capable of increasing the viscosity of water used for enhanced oil recovery.

SUMMARY OF THE PRESENT INVENTION

In one embodiment the present invention resides in a stable latex composition comprising:
water;
at least one polymer comprising from about 45 to about 65 weight percent ethylacrylate monomer residue, from about 10 to about 45 weight percent methylacrylic acid monomer residue and from about 20 to about 30 weight percent acrylic acid monomer residue;
at least one nonylphenol polyethylene oxide ether sulfate, wherein the polyethylene oxide adduct of the nonylphenol polyethylene oxide ether sulfate is comprised of at least about 20 moles of ethylene oxide monomer residue; and
wherein the polymer and the nonylphenol polyethylene oxide ether sulfate are present in an amount sufficient to provide the stable latex composition with a viscosity of less than about 50 centipoise.

In another embodiment of the present invention at least one propoxylated, ethoxylated propylene glycol nonionic surfactant block polymer is used as a co-surfactant with the nonylphenol polyethylene oxide ether sulfate.

The present invention also relates to solutions prepared from this composition and a method of using this latex composition in the recovery of subterranean oil.

DETAILED DESCRIPTION OF THE INVENTION

The stable latex composition of the present invention is an emulsion prepared by the emulsion polymerization of ethylacrylate, acrylic acid, and methylacrylic acid monomers by any of the known emulsion polymerization techniques. Preferably, the polymerization is by a free radical polymerization technique. It has unexpectedly been found that this latex composition can be prepared having a high polymer solids content while having a low viscosity and remaining stable during preparation and storage and yet be useful for preparing a high viscosity aqueous solution useful as an enhanced oil recovery fluid.

As stated, it has unexpectedly been found that the latex composition of the present invention can be prepared having a high weight percentage of polymer with a low viscosity. This is the result of not only using the particular types and amounts of monomers in preparing the polymer but by the use of a particular type of surfactant which not only assists in the emulsion polymerization of the monomers but also assists in providing the stability of the composition. In one embodiment the particular surfactant useful for the purposes of the present invention is nonylphenol polyethylene oxide ether sulfate wherein the polyethylene oxide adduct of the ether sulfate is comprised of at least about 20 moles of ethylene oxide monomer residue and preferably from about 20 to about 30 moles. The nonylphenol polyethylene oxide ether sulfate of the present invention has the following general formula:

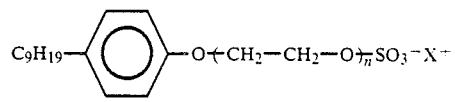

wherein n is at least about 20, preferably from about 20 to about 30, and X is any suitable cation. By moles of ethylene oxide monomer residue present in the adduct, it is meant the number average of moles for a given mixture of nonylphenol polyethylene oxide ether sulfate. Suitable cations are sodium, potassium, ammonium, and preferably sodium.

In another embodiment, a co-surfactant system is used comprising at least one nonylphenol polyethylene oxide ether sulfate and at least one propoxylated, ethoxylated propylene glycol nonionic surfactant block polymer of the general formula:

wherein a, b and c are positive integers and wherein a and c total from about 10 to about 100, e.g. from about 30 to about 50 and b ranges from about 5 to about 50. This type of surfactant comprises block polymers of ethylene oxide and propylene oxide, with the repeating units of propylene oxide constituting the hydrophobic portion of the surfactant and the repeating units of ethylene oxide constituting the hydrophilic portion of the surfactant. These type of surfactants can be prepared, and are commercially available, in a variety of molecular weights, depending primarily on the number of repeating units of propylene and ethylene oxide.

Suitable procedures for the production of these block polymers of the above formula are described in the patent literature in, for example, U.S. Pat. Nos. 2,674,619; 2,677,700 and 3,101,374, all three of which are incorporated herein by reference. Generally, these block polymers are prepared by a controlled addition of propylene oxide to the two hydroxyl groups of propylene glycol to form the hydrophobe, followed by the controlled addition of ethylene oxide to "sandwich" in the hydrophobe between the two hydrophilic polyethyleneoxide groups. These nonionic surfactants are available from the BASF-Wyandotte Corporation under the PLURONIC designation.

As already stated, the latex composition of the present invention is stable; that means it remains homogeneous without any precipitate formation even at a high weight percentage of polymer when the pH of the composition is from about 2 to about 2 to about 4 and at temperatures of about 32° F. to about 120° F. The amount of surfactant and polymer comprising the latex composition of the present invention is dependent upon the viscosity desired in the end use. Preferably, the composition is comprised of an amount of polymer and surfactant sufficient to provide a stable latex having a viscosity of less than about 50 centipoise (cp) more preferably from about 5 cp to about 20 cp, as measured using a Brookfield Synchro-Lectric viscometer equipped with a number 1 spindle revolving at 30 revolutions per minute (rpm) at room temperature (about 70° F.).

Preferably, the composition of the present invention comprises at least about 5 weight percent solids of the polymer, more preferably, at least about 21 weight percent, and still more preferably from about 21 to about 30 weight percent solids.

Generally, the polymer of the latex composition of the present invention is comprised of about 45 to about 65 weight percent ethylacrylate monomer residue, from about 20 to about 30 weight percent acrylic acid monomer residue and from about 10 to about 45 weight percent methylacrylic acid monomer residue. As the weight percent solids of the polymer in the latex composition increases, the weight percent of the particular monomers making up the polymer are adjusted to provide the composition with a viscosity of less than about 50 centipoise, preferably from about 5 to about 20 cp as discussed above. Preferably, when the weight percent solids content of the polymer is from about 21 to about 30, the polymer is comprised of about 55 to about 65 weight percent ethylacrylate monomer residue, from about 10 to about 25 weight percent acrylic acid monomer residue and from about 10 to about 30 weight percent methylacrylic acid monomer residue, and when the weight percent solids content of the polymer is from about 30 to about 35, the polymer is comprised from about 60 to about 65 weight percent ethylacrylate monomer residue, from about 10 to about 15 weight percent acrylic acid monomer residue and from about 20 to about 30 weight percent methylacrylic acid monomer residue. All reference herein to weight percent with respect to the monomers is based upon the total weight percent monomers used in preparing the polymer of the present invention.

In accordance with one embodiment the preferred amount of the nonylphenol polyethylene oxide ether sulfate useful for providing the composition of the present invention with a viscosity of less than about 50 centipoise at about 70° F. is from about 2 to about 10 parts per 100 parts of the monomer being polymerized, and more preferably from about 2 to about 4 parts per 100 parts of the monomer being polymerized.

In accordance with the co-surfactant system embodiment the total combined amount of the co-surfactant is from about 2 to about 10, more preferably about 2 to about 4 parts per 100 parts of monomer, with the ratio of nonylphenol polyethylene oxide ether sulfate to the propoxylated, ethyoxylated propylene glycol nonionic surfactant block polymer from about 1:2 to about 10:1, more preferably about 1:1.

The preferred method for preparing the polymer and the resulting latex composition of the present invention is by the free-radical emulsion polymerization of the monomers as initiated by any of the known free-radical initiators, such as the various organic and inorganic peroxides, e.g., lauryl peroxide, hydrogen peroxide, tertiary butyl hydroperoxide and the various percarbonates, persulfates, perborates, and the like. The amount of initiator used will depend upon the desired polymerization rate for a given amount of monomer being polymerized and the desired molecular weight of the polymer. It has been determined that the concentration of initiator necessary to effectively polymerize the monomers at a commercially attractive rate is at least about 0.0073 parts per 100 parts of monomer (phm) being polymerized, and preferably from about 0.0073 to about 0.132 phm, and still more preferably from about 0.0073 to about 0.025 phm. The preferred free radical initiator is tertiary butyl hydroperoxide. More preferably, a catalyst is used, such as sodium formaldehyde sulfoxylate, to speed up the reaction of the initiator in forming the free radical. The use of a catalyst also allows the reaction to be carried out at lower temperatures, for example, 32° F.

A batch emulsion free-radical polymerization process useful for the preparation of the composition of the present invention generally involves preparing an aqueous mixture of the surfactant, either the nonylphenol polyethylene oxide ether sulfate alone or in combination with the propoxylated, ethoxylated propylene glycol block polymer, and the monomers being polymerized with the concurrent or subsequent addition of at least one free-radical initiator and preferably the addition of at least one catalyst. The initiator may be added all at once, or stepwise. The polymerization reaction is typically carried out at ambient temperatures, usually from about 60° F. to 90° F. or as low as 35° F. with the use of the catalyst. After the free-radical polymerization is completed, the composition should have a pH of from about 2 to about 4 and more preferably of about 3.

The stable latex composition of the present invention is particularly suitable for use in the enhanced recovery of oil from a subterranean formation. The latex composition is useful in increasing the viscosity of water injected into a subterranean formation so as to displace the oil.

In preparing this viscous polymer solution, the latex composition is first diluted with water and neutralized. The latex composition is diluted with a sufficient amount of water to form an aqueous mixture having from about 1 to about 5 weight percent solids of polymer and preferably having 2 weight percent polymer. Preferably the water used as the diluent is fresh water. While a source of water other than fresh water may be used as the diluent, there is a potential of forming a flaky percipitate with high salt containing water. This flaky percipitate may usually be redispersed during the neutralization of the mixture. This neutralization is carried out concurrent with or subsequent to the dilution, using a caustic aqueous solution such as an ammonium hydroxide solution, sodium hydroxide solution, potassium hydroxide solution, or any of the other known caustic solutions. Typically, this caustic solution is in a concentrated form, for example, from 0.2N to 1N and preferably 0.5N. The caustic solution is generally prepared using fresh water. The resulting aqueous mixture has a pH from about 6.5 to about 11, and more preferably a pH of about 8.5. This neutralization and dilution may be conducted at the well site or carried out previous to transportation thereto.

The neutralized diluted latex composition is then used to increase the viscosity of water, typically field brine, at the well site to form a viscous polymer solution of any desired weight percent solids of the polymer. Generally, the concentration of polymer in the viscous polymer solution is dependent upon the final viscosity desired by the end user. Typically, it is desirable that the viscous polymer solution have a weight percent solids of polymer sufficient to yield a viscosity ratio of water to oil of at least about 1.0, preferably from about 1.0 to about 10 at reservoir temperature as determined by measuring the viscosity using any of the known means, such as a Brookfield viscometer, of both the oil and the viscous polymer solution and dividing the viscosity of the solution by that of the oil. The viscosities are typically measured using a Brookfield viscometer equipped with a Number 4 spindle. Preferably, the final concentration of the polymer in the viscous polymer solution is from about 200 to about 4000 parts per million polymer, and more preferably at about 1000 parts per million polymer.

The viscous polymer solution may then be injected into an oil bearing subterranean formation by any of the known techniques. Some of the various enhanced oil recovery techniques in which the viscous polymer solution of the present invention may be used are polymer flooding, micellar-polymer flooding, and alkaline flooding.

In polymer flooding a preflush liquid, such as, an aqueous sodium chloride solution (about 1% NaCl) or an aqueous orthosilicate solution, is optionally injected into the formation by any known means previous to the injection of the viscous polymer solution of the present invention so as to remove or precipitate out di- or polyvalent cations ($Ca^{++}$, $Mg^{++}$). This preflush liquid may be any of those known to those skilled in the art. After the viscous polymer solution of the present invention is injected into the formation, an aqueous drive solution which may contain some electrolytes, but is typically field brine, is then injected into the formation so as to drive the viscous polymer solution of the present invention and the oil before it toward a producing well. In micellar-polymer flooding a micellar slug containing a surfactant, alcohol, and water blended with an electrolyte such as, sodium chloride, or a soluble oil is injected into the formation by any known means prior to the injection of the viscous polymer solution of the present invention. In alkaline flooding an alkaline solution (caustic soda or sodium silicate) is injected into the formation by any known technique in place of the preflush liquid prior to the injection of the viscous polymer solution of the present invention.

The following examples serve to further illustrate and instruct one skilled in the art the best mode of how to practice this invention and are not intended to be construed as limiting thereof.

EXAMPLES 1-24

The following examples demonstrate latex and polymer solution compositions of the present invention having varying weight percent solids of polymer prepared from varying weight percents of the different monomers.

The latex compositions of all of the examples are prepared by a batch emulsion polymerization method. This involves charging a 4-neck flat bottom 1000 milliliter flask, which is provided with a paddle stirrer, reflux condenser, thermometer and a nitrogen inlet, with the desired amount of water, surfactant, monomers and initiator. The reaction is started by the addition of the appropriate amount of catalyst (sodium formaldehyde sulfoxylate) at room temperature. After about 25 minutes the temperature of the mixture rises to about 150° F. because of the exothermic reaction. The reaction is continued for about 2 hours with the mixture being constantly stirred and nitrogen being swept over the mixture continuously.

Each of Examples 1-14 is prepared by individually charging a flask with 440 grams of water, 28.3 grams of a nonylphenol polyethylene oxide sodium sulfate (Alipol Ep-115, sold by GAF Corp., 140 W. 51 St., N.Y., N.Y., which has a number average ethylene oxide mole content of the polyethylene oxide adduct of about 20), 8 drops of tertiary butyl hydroperoxide solution (a 70% solution of the hydroperoxide in water yielding approximately 0.12 grams) and a total of 170 grams of monomer (the amount of each specific monomer is given as a weight percent (wt. %) in Table 1 below for each example). After all of the ingredients in each example have been charged to the flask, a solution of sodium formaldehyde sulfoxylate (0.23 grams in 8.8 grams of water) is added to the mixture to catalyze the reaction.

Each of the Examples 15-24 is prepared by individually charging a flask with 400 grams of water, 33.9 grams of the same nonylphenol polyethylene oxide sodium sulfate as used for Examples 1-14, 9 drops of the same tertiary butyl hydroperoxide solution used for Examples 1-14 (yield about 0.135 grams of the hydroperoxide) and a total of 204 grams of monomer (the amount of each specific monomer given as a weight percent in Table 1 below for each example). After all of the ingredients in each example have been charged to the flask, a solution of sodium formaldehyde sulfoxylate (0.27 grams in 8.8 grams of water) is added to the mixture to catalyze the reaction.

The pH and viscosity for each composition of Examples 1-24 are determined and listed below in Table 1. The pH is measured using a standard pH meter, such as a PHM80 portable pH meter (sold by Radiometer, Copenhagen, Denmark) with the viscosity measured using a Brookfield Synchro-Lectric Viscometer equipped with a Number 1 spindle at room temperature, i.e., about 70° F.

Each of the latex compositions of Examples 1-24 are further diluted and neutralized so as to obtain a polymer aqueous solution composition having a weight percent polymer concentration of about 2 and a pH of around 7.5 (the actual pH for each of the Examples 1-24 is listed below in Table 1 and was determined according to the procedure stated above). The solution compositions were neutralized using an aqueous 1.1 percent NaOH solution. The viscosities for each example are determined by the procedure stated above, excepting a Number 4 spindle is used, and are listed below in Table 1.

As the results listed in Table 1 demonstrate latex compositions comprised of a surfactant and a polymer having monomer weight percentages in accordance with the present invention possess low viscosities, particularly when the weight percentages of monomer are within the preferred ranges. It is also shown that 2 percent neutralized polymer solution mixtures prepared from these latex compositions possess a high viscosity.

TABLE 1

| Example | Monomers (wt. %)[1] EA/AA/MAA | pH | Latex Viscosity (cp) | Latex Total Solids (wt. %) | 2 wt. % Neutralized Mixture pH | 2 wt. % Neutralized Mixture Viscosity (cp) |
|---|---|---|---|---|---|---|
| 1 | 40/0/60 | 3.21 | 246 | 27.5 | 6.75 | 4,300 |
| 2 | 50/0/50 | 3.35 | 27.2 | 27.4 | 7.41 | 5,600 |
| 3 | 50/10/40 | 3.16 | 3064 | 28.7 | 7.23 | 5,960 |
| 4 | 50/15/35 | coagulated | | | | |
| 5 | 50/20/30 | coagulated | | | | |
| 6 | 55/15/30 | 3.10 | 32.2 | 27.0 | 7.18 | 5,400 |

TABLE 1-continued

| Example | Monomers (wt. %)[1] EA/AA/MAA | pH | Latex Viscosity (cp) | Latex Total Solids (wt. %) | 2 wt. % Neutralized Mixture pH | 2 wt. % Neutralized Mixture Viscosity (cp) |
|---|---|---|---|---|---|---|
| 7 | 55/20/25 | 3.21 | 54.8 | 26.3 | 7.17 | 4,860 |
| 8 | 55/25/20 | 2.80 | 5980 | 26.5 | coagulated | |
| 9 | 60/15/25 | 3.33 | 12.2 | 26.9 | 7.92 | 3,660 |
| 10 | 60/20/20 | 3.25 | 14.8 | 26.7 | 7.03 | 5,060 |
| 11 | 60/25/15 | 3.12 | 12.2 | 26.7 | 7.34 | 3,400 |
| 12 | 60/30/10 | coagulated | | | | |
| 13 | 65/10/25 | 3.51 | 15.2 | 26.7 | 7.68 | 3,400 |
| 14 | 65/25/10 | 3.12 | 8.2 | 26.9 | 11.1 | 3,380 |
| 15 | 50/0/50 | 3.37 | 432 | 32.5 | — | — |
| 16 | 55/15/30 | syneresis | 287 | — | — | — |
| 17 | 55/25/20 | — | — | (32.5) | — | — |
| 18 | 55/35/10 | coagulated | — | — | — | — |
| 19 | 60/10/30 | 3.47 | 120.2 | 31.9 | 7.71 | 4,700 |
| 20 | 60/15/25 | 3.22 | 119 | 32.5 | 7.55 | 3,860 |
| 21 | 60/20/20 | — | — | (32.5) | — | — |
| 22 | 65/10/25 | 3.02 | 59.2 | 32.0 | 7.39 | 3,280 |
| 23 | 65/15/20 | 3.26 | 46 | 32.2 | — | — |
| 24 | 65/20/15 | coagulated | — | — | — | — |

[1]EA = Ethylacrylate
AA = Acrylic Acid
MAA = Methylacrylic Acid

EXAMPLES 25-42

The following examples demonstrate the effectiveness of a nonylphenol polyethylene oxide sulfate having a polyethylene oxide adduct with a number average mole content of at least 20 ethylene oxide monomer residues in comparison with other surfactants for preparing compositions in accordance with the present invention.

The procedure for preparing both the latex composition and the 2 weight percent aqueous polymer mixture is as described above for Examples 1-24. The types of surfactants to be used are listed below in Table A with the respective ethylene oxide monomer mole content (EO) for each type.

TABLE A

| Brand Name | Description | EO |
|---|---|---|
| Alipal: | Nonylphenol polyethylene oxide sulfate | |
| EP-120 | | 30 |
| EP-115 | | 20 |
| EP-110 | | 9 |
| Aerosol: | | |
| A-102 | Disodium-ethyoxylated alcohol $C_{10}$-$C_{12}$ half-ester of sulfosuccinic acid | 30 |
| A-103 | Disodium-ethoxylated nonylphenol half-ester of sulfonsuccinic acid | 9 |
| Tensol: | Nonylphenol polyethylene oxide propyl sulfonate | |
| AP-21 | | 20 |
| AP-10 | | 10 |
| Tensol: | Alkyl-ethoxylated sulfopropyl-ether | |
| AO-12 | | 12 |
| AO-7 | | 7 |
| Polystep B-22: | Ethoxylated alkyl sulfate ammonium salt | 12 |

The amounts of water, surfactant (including type), initiator, catalyst (sodium formaldehyde sulfoxylate) and monomers (listed by the type of monomer) used to prepare each example is listed below in Table B. Examples 25-33 have about 21 weight percent of polymer with Examples 34-42 having about 26 weight percent of polymer.

TABLE B

| Example No. | Surfactant[1] Type | Surfactant[1] (Grams) | Water (Grams) | Monomers[2] (Grams) EA | Monomers[2] (Grams) AA | Monomers[2] (Grams) MAA | Catalyst[3] (Grams) | Initiator[4] (Grams) |
|---|---|---|---|---|---|---|---|---|
| 25 | EP-120 | 22.6 | 480 | 74.8 | 34.0 | 27.2 | 0.18 | 0.09 |
| 26 | A-102 | 22.6 | 480 | 74.8 | 34.0 | 27.2 | 0.18 | 0.09 |
| 27 | EP-115 | 22.6 | 480 | 74.8 | 34.0 | 27.2 | 0.18 | 0.09 |
| 28 | A-103 | 22.6 | 480 | 74.8 | 34.0 | 27.2 | 0.18 | 0.09 |
| 29 | AP-20 | 6.8 | 495 | 74.8 | 34.0 | 27.2 | 0.18 | 0.09 |
| 30 | B-22 | 22.6 | 480 | 74.8 | 34.0 | 27.2 | 0.18 | 0.09 |
| 31 | AO-12 | 6.8 | 495 | 74.8 | 34.0 | 27.2 | 0.18 | 0.09 |
| 32 | AP-10 | 6.8 | 495 | 74.8 | 34.0 | 27.2 | 0.18 | 0.09 |
| 33 | AO-7 | 6.8 | 495 | 74.8 | 34.0 | 27.2 | 0.18 | 0.09 |
| 34 | EP-120 | 28.3 | 440 | 102 | 34 | 34 | 0.23 | 0.12 |
| 35 | A-102 | 28.3 | 440 | 102 | 34 | 34 | 0.23 | 0.12 |
| 36 | AP-20 | 28.3 | 440 | 102 | 34 | 34 | 0.23 | 0.12 |
| 37 | EP-115 | 28.3 | 440 | 102 | 34 | 34 | 0.23 | 0.12 |
| 38 | A-103 | 10 | 460 | 102 | 34 | 34 | 0.23 | 0.12 |
| 39 | AP-12 | 10 | 460 | 102 | 34 | 34 | 0.23 | 0.12 |
| 40 | AO-10 | 10 | 460 | 102 | 34 | 34 | 0.23 | 0.12 |
| 41 | EP-110 | 28.3 | 440 | 102 | 34 | 34 | 0.23 | 0.12 |

TABLE B-continued

| Example No. | Surfactant[1] Type | (Grams) | Water (Grams) | Monomers[2] (Grams) EA | AA | MAA | Catalyst[3] (Grams) | Initiator[4] (Grams) |
|---|---|---|---|---|---|---|---|---|
| 42 | AO-7 | 10 | 460 | 102 | 34 | 34 | 0.23 | 0.12 |

[1] All of the surfactants are in a solution with about 30% activity except for Tensol surfactants which have 100% activity. Assumed inactive portion is water so total amount water + surfactant is about 502 grams for Examples 25-33 and about 470 grams for Examples 34-42.
[2] EA, AA, and MAA are same as listed in TABLE 1 with the weight percentages of monomers as EA/AA/MAA ratio for Examples 25-33 is 55/25/20 and for Examples 34-42 is 60/20/20.
[3] Catalyst is a solution of 0.18 grams of the sulfoxylate in 8.8 grams of water for Examples 25-33 and 0.23 grams of the sulfoxylate is 8.8 grams of water for Examples 34-42.
[4] Initiator is a 70% solution of the hydroperoxide in water with 6 drops of the solution used for Examples 25-33 and 8 drops used for Examples 34-42.

The pH and viscosity is measured for the latex composition and the 2 percent polymer mixture of each respective latex composition for each example according to the procedures set forth above for Examples 1-24 with the results listed below in Table 2. As demonstrated by the results indicated below in Table 2 those compositions prepared from the surfactant of the present invention (Exs. 25, 27, 34, and 37) generally exhibited lower viscosities with the 2 percent neutralized mixtures prepared from these compositions generally possessing higher viscosities than compositions prepared with other surfactants.

TABLE 2

| Example No. | Type Surfactant | Latex Total Solids (wt. %) | pH | Viscosity (cp) | 2% Mixture pH | Viscosity (cp) |
|---|---|---|---|---|---|---|
| 25 | EP-120 | 21.0 | 3.11 | 7.8 | 7.36 | 6,080 |
| 26 | A-102 | 21.0 | 3.36 | 28.4 | 7.66 | 5,960 |
| 27 | EP-115 | 20.7 | 3.28 | 8.8 | 7.80 | 6,900 |
| 28 | A-103 | 21.4 | 3.27 | 19.4 | 7.65 | 6,880 |
| 29 | AP-20 | — | — | — | — | — |
| 30 | B-22 | — | — | — | — | — |
| 31 | AO-12 | 21.0 | 2.52 | 724.0 | — | — |
| 32 | AP-10 | 20.5 | 2.75 | 21.6 | — | — |
| 33 | AO-7 | — | — | — | — | — |
| 34 | EP-120 | 27.2 | 3.29 | 17.0 | 7.20 | 3,200 |
| 35 | A-102 | 26.3 | 3.70 | 81.2 | 7.89 | 3,820 |
| 36 | AP-20 | 26.7 | 2.88 | 11.6 | 7.21 | 2,720 |
| 37 | EP-115 | 26.7 | 3.25 | 14.8 | 7.03 | 5,060 |
| 38 | A-103 | 26.7 | 3.70 | 43.0 | 7.48 | 5,160 |
| 39 | AO-12 | (unstable) | | 676.0 | 7.67 | 5,280 |
| 40 | AP-10 | (syneresis) | | 285.0 | 7.69 | 1,040 |
| 41 | EP-110 | — | — | — | — | — |
| 42 | AO-7 | — | — | — | — | — |

EXAMPLES 43-59

In the following examples the amounts of the surfactants and the initiator (tertiary butyl hydroperoxide) are varied. The amounts of monomer necessary to prepare Examples 43-51 are the same as for the amounts used in Examples 25-33 above with the amounts for preparing Examples 52-59 the same as for the amounts used in Examples 34-42 above. The amounts of water, surfactant (in both grams and parts per hundred parts monomer (phm)) and initiator (tertiary butyl hydroperoxide in phm) added for each example is listed below in Table C. The amount of catalyst used for each example is at a 2:1 weight ratio with respect to the amount of initiator used.

TABLE C

| Example No. | Surfactant Type | Amount (Grams) | (phm) | Initiator (phm) | Water (Grams) |
|---|---|---|---|---|---|
| 43 | EP-115 | 22.6 | 5.0 | 0.066 | 480 |
| 44 | EP-115 | 22.6 | 5.0 | 0.022 | 480 |
| 45 | EP-115 | 11.3 | 2.5 | 0.066 | 490 |
| 46 | EP-115 | 11.3 | 2.5 | 0.022 | 490 |
| 47 | AP-20 | 12.0 | 7.5 | 0.066 | 490 |
| 48 | AP-20 | 8.0 | 5.0 | 0.066 | 495 |
| 49 | AP-20 | 4.0 | 2.5 | 0.066 | 500 |
| 50 | AO-12 | 8.0 | 5.0 | 0.066 | 495 |
| 51 | AO-12 | 12.0 | 7.5 | 0.066 | 490 |
| 52 | EP-115 | 28.3 | 5.0 | 0.132 | 440 |
| 53 | EP-115 | 28.3 | 5.0 | 0.066 | 440 |
| 54 | EP-115 | 28.3 | 5.0 | 0.055 | 440 |
| 55 | EP-115 | 14.1 | 2.5 | 0.066 | 455 |
| 56 | AP-20 | 10.0 | 5.0 | 0.066 | 460 |
| 57 | AP-10 | 10.0 | 5.0 | 0.066 | 460 |
| 58 | AP-10 | 5.0 | 2.5 | 0.066 | 465 |

The pH and viscosity is measured for the latex composition and the 2 percent polymer mixture (as prepared according to the above stated procedures) of each respective latex composition for each example according to the procedures set forth above for Examples 1-24 with the results listed below in Table 3.

TABLE 3

| Example No. | Surfactant (phm) Type | Initiator (phm) | Latex Solids (wt %) | Latex Viscosity pH | (cps) | 2% Neutralized Polymer Solution Viscosity pH | (cps) |
|---|---|---|---|---|---|---|---|
| 43 | 5.0 EP-115 | 0.066 | 20.7 | 3.28 | 8.8 | 7.80 | 6,900 |
| 44 | 5.0 EP-115 | 0.022 | 20.6 | 3.08 | 14.0 | 7.41 | 6,760 |
| 45 | 2.5 EP-115 | 0.066 | 20.4 | 3.03 | 8.8 | 7.47 | 6,760 |
| 46 | 2.5 EP-115 | 0.022 | 20.2 | 3.03 | 12.6 | 7.52 | 7,200 |
| 47 | 7.5 AP-20 | 0.066 | — | coagulated | | | |
| 48 | 5.0 AP-20 | 0.066 | — | coagulated | | | |
| 49 | 2.5 AP-20 | 0.066 | — | coagulated | | | |
| 50 | 5.0 AO-12 | 0.066 | — | coagulated | | | |
| 51 | 7.5 AO-12 | 0.066 | 26.1 | 3.12 | 2640.0 | syneresis | |
| 52 | 5.0 EP-115 | 0.132 | 26.8 | 3.33 | 12.8 | 7.90 | 4,500 |
| 53 | 5.0 EP-115 | 0.066 | 26.7 | 3.25 | 14.8 | 7.03 | 5,060 |
| 54 | 5.0 EP-115 | 0.055 | 26.7 | 3.27 | 13.6 | 7.78 | 4,800 |
| 55 | 2.5 EP-115 | 0.066 | 26.1 | 3.11 | 11.0 | 7.36 | 4,000 |
| 56 | 5.0 AP-20 | 0.066 | 26.7 | 2.88 | 11.6 | 7.21 | 2,720 |
| 57 | 5.0 AP-10 | 0.066 | 26.5 | 2.82 | 285 | 7.69 | 1,040 |

TABLE 3-continued

| Example No. | Surfactant (phm) Type | Initiator (phm) | Latex Solids (wt %) | Latex Viscosity pH | Latex Viscosity (cps) | 2% Neutralized Polymer Solution Viscosity pH | 2% Neutralized Polymer Solution Viscosity (cps) |
| --- | --- | --- | --- | --- | --- | --- | --- |
| 58 | 2.5 AP-10 | 0.066 | 26.0 | 2.99 | 12.4 | 8.46 | 4,540 |

EXAMPLES 59-76

The following examples demonstrate the use of the co-surfactant system in preparing the latex composition and the 2 weight percent aqueous polymer solution.

The procedure for preparing the latex and polymer solution compositions and mixture is as described above for Examples 1-24. Each latex example was prepared by charging 400 grams (g) water, 11.6 g of a nonylphenol polyethylene oxide ether sulfate (Alipal EP-115, as described above in Table A), 3.4 g of a propoxylated, ethoxylated propylene glycol nonionic surfactant block polymer (the block polymers used are sold by the BASF Wyandotte Company under the designation Pluronic ® surfactants), 136 g of monomer (with the weight percent ethylacrylate/methacrylic acid/acrylic acid being 55/20/25 and 6 drops of a 70% solution of tertiary butyl hydroperoxide in water to a one-liter 4-neck reactor and initiating the reaction by the addition of a solution of 0.18 g of sodium formaldehyde sulfoxylate in 8.8 g of water.

The examples differed by the molecular weight of the Pluronic ® surfactant used, which are listed for the respective example in Table 4 below.

Also listed in Table 4 are the respective solids content in weight percent (wt.%) for each example and pH and viscosity (in centipoise (cps)) for each of the examples for the stable latex composition and aqueous polymer solution composition, which was prepared by diluting the latex composition as described above for Examples 1-24.

TABLE 4

| Example No | Pluronic ® Surfactant MW | Solids Wt. % | Latex Viscosity pH | Latex Viscosity (cps) | Solution Viscosity pH | Solution Viscosity (cps) |
| --- | --- | --- | --- | --- | --- | --- |
| 59 | 5,000 | 19.9 | 2.91 | 14.4 | 7.52 | 7,380 |
| 60 | 6,600 | 17.5 | 2.86 | 9.4 | 8.36 | 7,200 |
| 61 | 14,000 | 19.5 | 2.98 | 7.0 | 9.40 | 6,460 |
| 62 | 4,200 | 19.3 | 2.93 | 20.6 | 7.29 | 7,320 |
| 63 | 4,600 | 19.9 | 2.87 | 9.6 | — | — |
| 64 | 5,850 | 20.0 | 2.96 | 14.0 | 7.46 | 7,300 |
| 65 | 1,100 | 19.7 | 2.99 | 9.2 | 7.51 | 7,680 |
| 66 | 1,850 | 19.1 | 2.81 | 21.2 | 7.53 | 7,960 |
| 67 | 1,850 | 19.1 | 2.81 | 21.2 | 11.28 | 8,540 |
| 68 | 2,900 | 19.8 | 2.91 | 25.6 | 7.31 | 7,180 |
| 69 | 2,800 | high coagulum | | | | |
| 70 | 3,120 | 19.8 | 2.92 | 17.0 | 7.20 | 7,040 |
| 71 | 3,000 | 19.9 | 2.85 | 14.2 | 7.20 | 6,840 |
| 74 | 4,500 | 19.6 | 2.95 | 11.0 | 7.14 | 7,840 |
| 75 | 9,000 | 19.5 | 2.92 | 20.2 | 7.50 | 4,540 |
| 76 | 4,300 | 20.2 | 2.94 | 13.2 | 7.10 | 5,960 |

As seen from the above examples, latex and polymer solution compositions prepared with the co-surfactants exhibit generally higher viscosities in comparison to those compositions and mixtures prepared with the nonylphenol oxide ether sulfate alone. See specifically Examples 45 and 46 above for a comparison of these Examples with compositions having similar amounts and ratios of monomer, surfactant, and other ingredients.

While the preferred embodiments have been described and illustrated, various substitutes and modifications may be made thereto without departing from the spirit and scope of the present invention. Accordingly, the present invention has been described by way of illustration and not limitation, and no limitations should be imposed other than as indicated.

What is claimed is:

1. A stable latex composition comprising:
   water;
   at least one polymer comprising from about 45 to about 65 weight percent ethylacrylate monomer residue, from about 10 to about 45 weight percent methylacrylic acid monomer residue, and from about 20 to about 30 weight percent acrylic acid monomer residue; and
   from about 2 to about 10 parts per 100 parts of monomer of a co-surfactant system comprising:
   (a) at least one nonylphenol polyethylene oxide ether sulfate, wherein the polyethylene oxide adduct of the nonylphenol polyethylene oxide ether sulfate is comprised of at least about 20 moles of ethylene oxide monomer residue; and
   (b) at least on propoxylated, ethoxylated propylene glycol nonionic surfactant block polymer, wherein the ether sulfate and block polymer are provided at a ratio to each other of from about 1:2 to about 10:1.

2. The composition of claim 1 wherein the composition is comprised of at least about 5 percent solids of the polymer.

3. The composition of claim 1 wherein the composition is comprised of from about 21 to about 30 percent solids of the polymer.

4. The composition of claim 1 wherein the composition is comprised from about 20 to about 35 percent solids of the polymer.

5. A stable latex composition comprising:
   water;
   at least one polymer comprising from about 55 to about 65 weight percent ethylacrylate monomer residue, from about 10 to about 30 weight percent methylacrylic acid monomer residue, and from about 10 to 25 weight percent acrylic acid monomer residue; and
   from about 2 to about 10 parts per 100 parts of monomer of a co-surfactant system comprising:
   (a) at least one nonylphenol polyethylene oxide ether sulfate, wherein the polyethylene oxide adduct of the nonylphenol polyethylene oxide ether sulfate is comprised of at least about 20 moles of ethylene oxide monomer residue; and
   (b) at least one propoxylated, ethoxylated propylene glycol nonionic surfactant block polymer, wherein the ether sulfate and block polymer are provided at a ratio to each other of from about 1:2 to about 10:1.

6. A stable latex composition comprising:
   water;

at least one polymer comprising from about 60 to about 65 weight percent ethylacrylate monomer residue, from about 20 to about 30 weight percent methylacrylic acid monomer residue, and from about 10 to about 15 weight percent acrylic acid monomer residue; and from about 2 to about 10 parts per 100 parts of monomer of a co-surfactant system comprising:
(a) at least one nonylphenol polyethylene oxide ether sulfate, wherein the polyethylene oxide adduct of the nonylphenol polyethylene oxide ether sulfate is comprised of at least about 20 moles of ethylene oxide monomer residue; and
(b) at least one propoxylated, ethoxylated propylene glycol nonionic surfactant block polymer, wherein the ether sulfate and block polymer are provided at a ratio to each other of from about 1:2 to about 10:1.

7. The composition of claim 5 wherein the composition is comprised of from about 2 to about 4 parts per 100 parts monomer of the co-surfactant system.

8. The composition of claim 6 wherein the composition is comprised of from about 2 to about 4 parts per 100 parts monomer of the co-surfactant system.

9. The compositions of claim 5, 6, 7 or 8 wherein the polyethylene adduct of the nonylphenol polyethylene oxide ether sulfate is comprised of from about 20 to about 30 moles of ethylene oxide monomer residue.

10. The composition of claim 9 wherein the nonylphenol polyethylene oxide ether sulfate contains a cation selected from the group consisting of sodium, potassium, and ammonium.

11. The composition of claim 10 wherein the ratio of said surfactants is about 1:1.

* * * * *